United States Patent
Kan et al.

(10) Patent No.: US 10,070,266 B2
(45) Date of Patent: Sep. 4, 2018

(54) METHOD AND SYSTEM OF INDOOR POSITIONING OF A USER AND DELIVERY OF INFORMATION THERETO

(71) Applicant: MediaTek Inc., Hsinchu (TW)

(72) Inventors: Tai-Wei Kan, Taipei (TW); Tsung-Te Wang, Taipei (TW); Yi-Kai Lee, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/629,751

(22) Filed: Jun. 22, 2017

(65) Prior Publication Data

US 2017/0289770 A1    Oct. 5, 2017

Related U.S. Application Data

(63) Continuation of application No. 14/692,726, filed on Apr. 21, 2015, now Pat. No. 9,736,653.

(51) Int. Cl.
*H04W 4/00* (2018.01)
*H04W 4/021* (2018.01)
*H04W 4/04* (2009.01)

(52) U.S. Cl.
CPC .......... *H04W 4/04* (2013.01); *H04W 4/022* (2013.01)

(58) Field of Classification Search
CPC ..... H04W 64/00; H04W 4/02; H04W 64/003; H04W 4/021; H04W 4/028; H04W 4/008; H04W 4/023; H04W 88/08; H04W 4/04; H04W 48/20; H04W 4/025; H04W 16/18; H04W 88/02; H04W 88/12; H04W 24/10; H04W 40/244; H04W 48/04; H04W 4/022; G01S 5/14; G01S 5/0294; G01S 5/06; H04B 17/27; H04L 43/0864; H04L 5/0069; H04M 1/72572
See application file for complete search history.

(56) References Cited

U.S. PATENT DOCUMENTS

| 2005/0068938 A1* | 3/2005 | Wang | H04M 1/72502 370/352 |
| 2010/0128853 A1* | 5/2010 | Karnalkar | H04M 3/53375 379/39 |

* cited by examiner

*Primary Examiner* — Nizar Sivji
(74) *Attorney, Agent, or Firm* — Han IP Corporation; Andy M. Han

(57) ABSTRACT

Methods and systems of indoor positioning of a user and delivery of information thereto are described. A system may include a communication device and a plurality of networked devices. The communication device may receive incoming information which is intended for receipt by a user, and transmit a request signal responsive to the receiving of the incoming information. Each of the networked devices may receive the request signal, and determine which one of the networked devices is situated to notify the user of the incoming information. The networked device situated to notify the user may proceed to notify the user of the incoming information.

5 Claims, 5 Drawing Sheets

METHOD AND SYSTEM OF INDOOR POSITIONING OF A USER AND DELIVERY OF INFORMATION THERETO

CROSS REFERENCE TO RELATED PATENT APPLICATION

The present disclosure is part of a continuation application of U.S. patent application Ser. No. 14/692,726, filed 21 Apr. 2015, the content of which is incorporated by reference in its entirety.

TECHNICAL FIELD

The inventive concept described herein is generally related to indoor positioning and, more particularly, to techniques pertaining to indoor positioning of a user and delivery of information thereto.

BACKGROUND

Unless otherwise indicated herein, approaches described in this section are not prior art to the claims listed below and are not admitted to be prior art by inclusion in this section.

With the prevalence of mobile communication devices such as smartphones, people are increasingly more dependent on sending and receiving messages using a mobile communication device. Nevertheless, there may be times when a user of a mobile communication device is temporarily away from the mobile communication device. There may also be times when an important message the user would not want to miss is received at the mobile communication device when the user happens to be away from the mobile communication device.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, techniques, methods, apparatuses and systems for indoor positioning of a user and delivery of information to the user. Advantageously, implementations of the present disclosure help a user avoid missing messages received at a communication device from which the user is away.

In one aspect, a method may involve a communication device receiving incoming information which is intended for receipt by a user. The method may also involve the communication device transmitting a request signal to a plurality of networked devices, with the request signal indicating the receiving of the incoming information. The method may further involve the communication device receiving a response signal indicating that a first networked device of the plurality of networked devices is situated to notify the user of the incoming information.

In another aspect, a method may involve a first networked device receiving a request signal originated from a communication device, with the request signal indicating the communication device receiving incoming information which is intended for receipt by a user. The method may also involve the first networked device determining whether the first networked device is situated to notify the user of the incoming information. The method may further involve the first networked device providing a notification to the user responsive to a determination that the first networked device is situated to notify the user.

In yet another aspect, a system may include a communication device, a plurality of networked devices, and an access point device communicatively connected to the communication device and the plurality of networked devices. The communication device may be configured to receive incoming information which is intended for receipt by a user, and transmit a first request signal responsive to receiving the incoming information. The first request signal may indicate the receiving of the incoming information at the communication device. The access point device may be configured to receive the first request signal, and determine a position of the user. The access point device may also be configured to determine that a first networked device of the plurality of networked devices is situated to notify the user of the incoming information. The access point device may be further configured to transmit a response signal to the communication device, with the response signal indicating that the first networked device is situated to notify the user of the incoming information.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Overview

Figure 1:
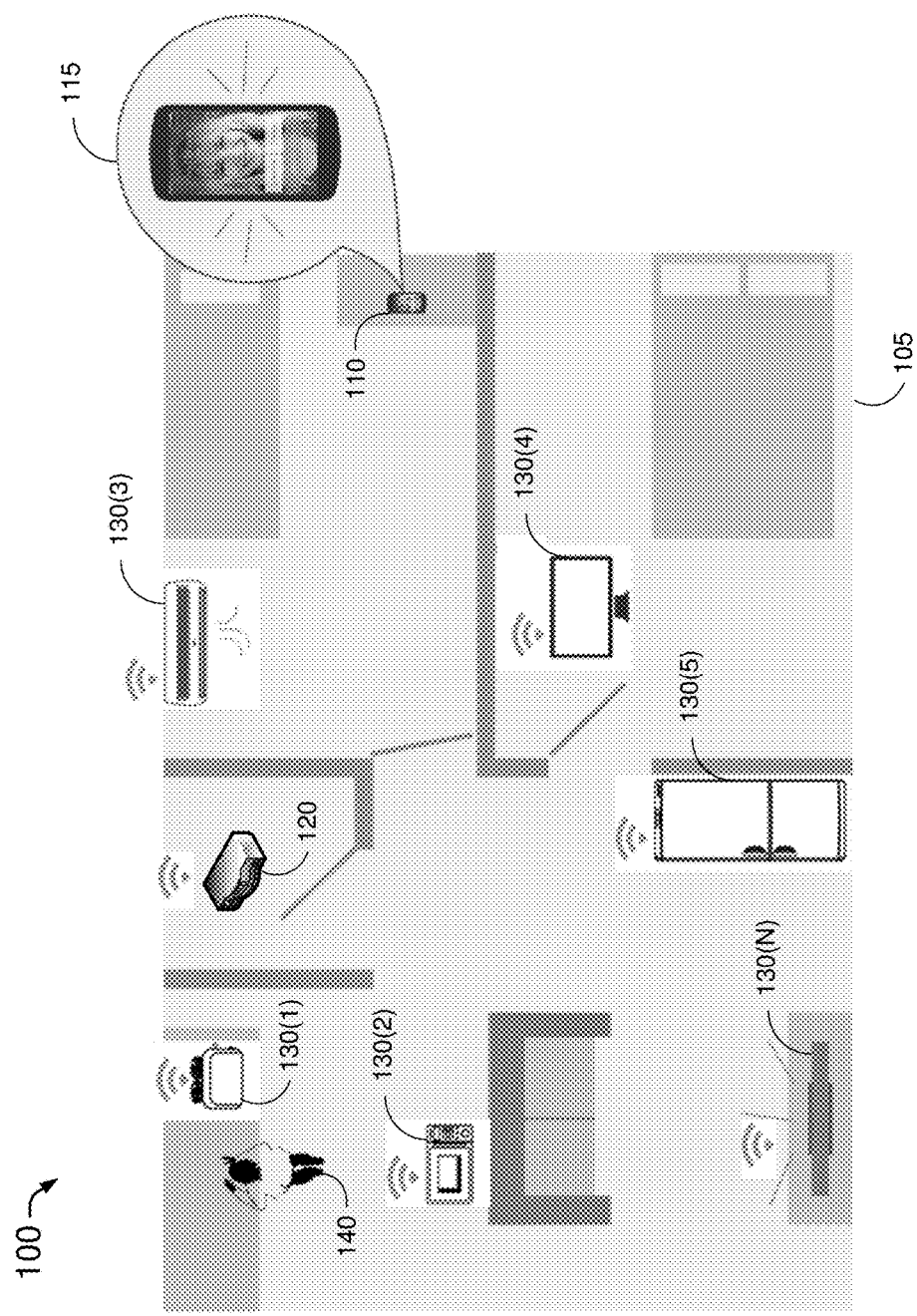
FIG. 1 is a diagram of an example environment in which a system in accordance with an implementation of the present disclosure operates.

In various implementations of the present disclosure, networked devices in a space may be aware of the relative position and distance among each other. When a user is within the space the network devices may determine which one of the networked devices is optimally situated, e.g., closest or optimally oriented in a suitable direction, to notify the user of an incoming message received at a communication device which may, at the moment, not in the proximity of the user. For instance, one or more networked devices 130(1)-130(N) may be equipped with a camera and may periodically activate the camera to capture image(s) of the space to identify the direction in which user 140 and/or the respective networked device is facing.

In the modern days, people often carry a mobile communication device, e.g., a smartphone, as a means to stay "connected". However, when a user of a mobile communication device gets home he may leave the mobile communication device on a desk or a bed in the bedroom, and then move on to do house chores in the same or a different room/space of the home, e.g., kitchen. If, coincidentally, a call from an important client arrives at the mobile communication device, implementations of the present disclosure may be able to help the user receive the call instead of missing the call, given that the home of the user is equipped with a number of networked devices configured to function in accordance with the present disclosure.

Implementations of the present disclosure may utilize any of one or more suitable indoor positioning technology or system, including the Bluetooth Low Energy (BLE) technology (also known as "Bluetooth Smart"), to determine the relative location or position of each of multiple networked devices in the home or a given location/space. For instance, wireless beacon devices may be used with each beacon device emitting wireless beacon signals as well receiving wireless beacon signals emitted by one or more other beacon devices in the surrounding. Any suitable wireless technology, standard or protocol may be utilized, including but not limited to, Wi-Fi, Bluetooth, BLE, near field communication (NFC), infrared, radio frequency identification (RFID), subsonic waves, sonic waves, ultrasonic waves and yet-to-be-developed wireless technologies.

Utilizing one or more of the above-listed technologies, standards and protocols, the determination of which one of the multiple networked devices is optimally situated may be rendered. A networked device may be determined to be optimally situated to notify the user when the networked device is nearest the user compared to other networked devices in the same space. Alternatively or additionally, a networked device may be determined to be optimally situated to notify the user when the networked device is oriented to provide notification to the user. For instance, a first networked device may be nearer the user compared to a second networked device, but a display panel of the second networked device may be directly facing the user while the first networked device may have no display capability or may have a display panel that is facing away from the user. In such case the second networked device may be determined to be more optimally situated than the first networked device to provide notification to the user, e.g., when the notification to be delivered is to be visually displayed to the user.

FIG. 1 illustrates an example environment 100 in which a system in accordance with an implementation of the present disclosure operates.

Example environment 100 may be implemented in any suitable location, space or setting with multiple networked appliances or networked devices 130(1)-130(N) located therein, where N is a positive integer greater than one. For illustrative purpose without limiting the scope of the present disclosure, in FIG. 1 example environment 100 is shown as being implemented in a home 105 of a user 140. Home 105 may be divided into multiple living spaces including, for example, a living room, a kitchen, a storage room and two bedrooms as shown in FIG. 1. Accordingly, networked devices 130(1)-130(N) may include, for example, a toaster as networked device 130(1), a microwave as networked device 130(2), an air conditioner as networked device 130 (3), a television in one of the bedrooms as networked device 130(4), a refrigerator as networked device 130(5), and a television in the living room as networked device 130(N). Those skilled in the art would appreciate that, although a home setting is shown in example environment 100, implementations of the present disclosure are not limited to a home setting.

Example environment 100 may further include a mobile communication device 110, e.g., a smartphone, smartwatch, personal digital assistant (PDA), tablet computer, phablet, wearable computing device or the like, which is capable of user interaction with user 140 as well as receiving and transmitting data in the form of texts, audible signals, visual signals, audio information, video message and/or multimedia. User 140 may configure settings on mobile communication device 110 to indicate what types of information, date or messages are deemed "important" and therefore mobile communication device 110 is to notify user 140, using techniques in accordance with the present disclosure, as mobile communication device 110 receives any of such "important" information, data, messages and/or calls when user 140 is not in proximity of and away from mobile communication device 110. For instance, user 140 may configure mobile communication device 110 to notify user 140 about receipt of any incoming calls, text messages, emails and/or video call sessions from a select number of individuals, e.g., spouse of user 140, child(ren) of user 140, boss from work and the like. Alternatively or additionally, user 140 may configure mobile communication device 110 to notify user 140 about receipt of one or more particular types of incoming information, data or messages regardless of sending party. Accordingly, mobile communication device 110 is to notify user 140, via one or more of networked devices 130(1)-130(N), when mobile communication device 110 receives "important" incoming information, data, messages or calls.

Using beacon signals or any suitable wireless technology, the networked devices 130(1)-130(N) may be communicatively connected to each other. Thus, after one of the networked devices 130(1)-130(N) becomes aware of the position or location of mobile communication device 110, it may transmit information about the position or location of mobile communication device 110 to others of networked devices 130(1)-130(N) so that they are also aware of the position or location of mobile communication device 110.

Example environment 100 may optionally include an access point device 120, e.g., a Wi-Fi access point device, which is communicatively connected to each of the networked devices 130(1)-130(N). Access point device 120 may function as the hub of communication among networked devices 130(1)-130(N). That is, instead of or in addition to communicating directly with each other, networked devices 130(1)-130(N) may communicate with each other through access point device 120. Additionally or alternatively, access point device 120 may function as a conduit of communication between mobile communication device 110 and one or more of networked devices 130(1)-130(N). That is, communication between one or more of networked devices 130(1)-130(N) with mobile communication device 110 may be through access point device 120. Moreover, access point device 120 may be configured to receive, collect or otherwise gather information from each of networked devices 130(1)-130(N) to determine the location or position of user 140, the location or position of each of networked devices 130(1)-130(N), as well as which one of networked devices 130(1)-130(N) is optimally situated to provide notification to user 140 at a given time.

In one scenario, networked devices 130(1)-130(N) may be able to detect the presence and approximate location of user 140 based at least in part on positional/locational information provided by a wearable or portable device carried by user 140. For instance, the wearable or portable device carried by user 140 may be equipped with one or more sensors, e.g., gyroscope and/or global positioning system (GPS) chip, which may sense the movement, orientation, position or location of the wearable or portable device carried by user 140 and correspondingly generate data representative of the results of the sensing. Such data may be wirelessly transmitted to and received by one or more of networked devices 130(1)-130(N) when the wearable or portable device carried by user 140 is communicatively connected to one or more of networked devices 130(1)-130(N), even if the distance between the wearable or portable device carried by user 140 and mobile communication device 110 is outside a normal Bluetooth communication range therebetween.

In another scenario, one or more of networked devices 130(1)-130(N) may be equipped of microphone. As a microphone can receive audible signals, sounds waves, subsonic waves, sonic waves and/or ultrasonic waves generated by user 140, e.g., as user 140 moves about in the home 105 and as user 140 speaks to other family members or on the phone. Based on analysis of volume and voiceprint, the one or more of networked devices 130(1)-130(N) may be able to determine the relative distance between user 140 and such one or more microphone-equipped networked devices. Accordingly, networked devices 130(1)-130(N) may then determine which one among all of the networked devices 130(1)-130(N) is the closest or nearest one to user 140. One or more of networked devices 130(1)-130(N) may be capable of transmitting waves, e.g., ultrasonic waves, which may be reflected by user 140 as user 140 moves about in home 105. This may allow the one or more of networked devices 130(1)-130(N) equipped with such capability to determine the position or location of user 140, and transmit information of the determined position or location of user 140 to other ones of networked devices 130(1)-130(N).

In still another scenario, the strength of Wi-Fi signals emitted from mobile communication device 110 may be used as a way to determine the location of mobile communication device 110, e.g., by triangulation when multiple ones of the networked devices 130(1)-130(N) can receive and determine the strength of Wi-Fi signals from mobile communication device 110. Moreover, given the presence of a Wi-Fi access point device 120, the strength of Wi-Fi signal between the access point device 120 and each of networked devices 130(1)-130(N) may be used to determine the position or location of networked devices 130(1)-130(N) relative to the access point device 120. Furthermore, amongst the networked devices 130(1)-130(N), any suitable mechanism, e.g., BLE broadcast, may be used to communicate with each other to determine the relative distance between each pair of the networked devices 130(1)-130(N).

As shown in FIG. 1, user 140 may be at least temporarily away from mobile communication device 110, e.g., by leaving mobile communication device 110 on a desk in one of the bedrooms before heading to the kitchen to prepare dinner. User 140 may or may not carry a wearable or portable device which is communicatively connected to one or more of networked devices 130(1)-130(N). In any event, in example environment 100 the position or location of user 140 in home 105 may be detected and determined by one or more of networked devices 130(1)-130(N).

While user 140 is away from mobile communication device 110, a text message, an email, a voice call, a video call, an invitation to start a video conference call or a reminder message (all of which referred to as "incoming information 115" herein), intended for receipt by user 140, may be received by mobile communication device 110. Responsive to receiving incoming information 115, mobile communication device 110 may transmit a first request signal indicating the receipt of incoming information 115. One or more of networked devices 130(1)-130(N) may receive the first request, whether directly or indirectly through access point device 120. Thereafter, the networked devices 130(1)-130(N) determine which one of them is situated to notify user 140 of incoming information 115. For simplicity of description without limiting the scope of the present disclosure, in the example described herein, networked device 130(1) is determined to be optimally situated to provide notification to user 140. Once it is determined that networked device 130(1) is optimally situated to notify user 140 about incoming information 115, networked device 130(1) (or any other one of the networked device 130(2)-130(N)) may transmit a response signal indicating that networked device 130(1) is situated to notify user 140 of incoming information 115. Mobile communication device 110 may receive the response signal directly from networked device 130(1), indirectly through one or more other networked devices 130(2)-130(N), or indirectly through access point device 120. In response, mobile communication device 110 may transmit to networked device 130(1), whether directly to networked device 130(1), indirectly through one or more other networked devices 130(2)-130(N), or indirectly through access point device 120, a second request signal that causes networked device 130(1) to notify user 140 of incoming information 115. Accordingly, networked device 130(1) may then provide a notification to user 140 after it is determined that networked device 130(1) is optimally situated to notify user 140. For instance, networked device 130(1) may be equipped with a light that flashes or may be equipped with a speaker that plays a sound or a pre-recorded message, e.g., "You have an incoming call", to alert user 140 of the receipt of incoming information 115 at mobile communication device 110. As a result, user 140 may go to mobile communication device 115 to receive incoming information 115. Accordingly, mobile communication device 115 may receive an input from user 140 and provide incoming information 115 to user 140.

In example environment 100, at least one of the networked devices 130(1)-130(N) or, alternatively, access point device 120 may be configured to determine which one of the networked devices 130(1)-130(N) is optimally situated to provide notification to user 140 regarding the receipt of incoming information 115. In some implementations, in determining which one of the networked devices 130(1)-130(N) is optimally situated to provide notification to user 140 regarding the receipt of incoming information 115, access point device 120 or one or more of networked devices 130(1)-130(N) may perform operations including: obtaining position information indicating a position of user 140; receiving information indicating or determining a first distance between user 140 and networked device 130(1) based at least in part on the position information; receiving information indicating or determining a second distance between user 140 and at least another one of networked devices 130(2)-130(N), e.g., that of networked device 130(2); comparing the first distance and the second distance; and determining that networked device 130(1) is optimally situated to notify user 140 in response to a result of the comparing indicating the first distance being less than the second distance. The position information may be provided by one or more of networked devices 130(1)-130(N) capable of determining the position or location of user 140. The first distance and second distance may be calculated, computed, estimated or otherwise determined by access point device 120 or one or more of the networked devices 130(1)-130(N). In this example, networked device 130(1) may be better situated to provide notification to user 140 because it is physically closest to user 140 than any other ones of networked devices 130(2)-130(N).

In some implementations, in determining which one of the networked devices 130(1)-130(N) is optimally situated to provide notification to user 140 regarding the receipt of incoming information 115, access point device 120 or one or more of networked devices 130(1)-130(N) may perform operations including: obtaining position information indicating a position of user 140; receiving information indicating or determining a first direction in which networked device 130(1) is generally oriented to provide either or both audio and visual signals; receiving information indicating or determining a second direction in which at least another one of networked devices 130(2)-130(N), e.g., networked device 130(2), is generally oriented to provide either or both audio and visual signals; comparing the first direction and the second direction with respect to the position of user 140; and determining that networked device 130(1) is optimally situated to notify user 140 in response to a result of the comparing indicating the first direction being more toward the user than the second direction. The direction of each of networked devices 130(1)-130(N) may be provided by each of networked devices 130(1)-130(N). In this example, networked device 130(1) may be better situated to provide notification to user 140 because a display or speaker of networked device 130(1) is better pointed or directed at user 140 than that of networked device 130(2).

In some implementations, in determining which one of the networked devices 130(1)-130(N) is optimally situated to provide notification to user 140 regarding the receipt of incoming information 115, access point device 120 or one or more of networked devices 130(1)-130(N) may perform operations including: obtaining position information indicating a position of user 140; receiving information indicating or determining a first distance between user 140 and networked device 130(1) based at least in part on the position information; receiving information indicating or determining a first direction in which networked device 130(1) is generally oriented to provide either or both audio and visual signals; receiving information indicating or determining a second distance between user 140 and at least another one of networked devices 130(2)-130(N), e.g., networked device 130(2); receiving information indicating or determining a second direction in which at least another one of networked devices 130(2)-130(N), e.g., networked device 130(2), is generally oriented to provide either or both audio and visual signals; comparing the first distance and the second distance; comparing the first direction and the second direction with respect to the position of user 140; and determining that networked device 130(2) is better situated to notify user 140 in response to a result of the comparing of the first distance and the second distance indicating the first distance being less than the second distance and a result of the comparing of the first direction and the second direction indicating the second direction being more toward user 140 than the first direction. The position information may be provided by one or more of networked devices 130(1)-130(N) capable of determining the position or location of user 140. The first distance and second distance may be calculated, computed, estimated or otherwise determined by access point device 120 or one or more of the networked devices 130(1)-130(N). The direction of each of networked devices 130(1)-130(N) may be provided by each of networked devices 130(1) 130(N). In this example, even though networked device 130(1) may be physically closer to user 140, networked device 130(2) may be better situated to provide notification to user 140 because a display or speaker of networked device 130(2) is better pointed or directed at user 140 than that of networked device 130(1).

In some implementations, in obtaining position information indicating a position of user 140, access point device 120 or one or more of networked devices 130(1)-130(N) may perform operations including: receiving information indicating or determining a first estimated position of user 140 relative to a first networked device, e.g., networked device 130(1); receiving information indicating or determining a second estimated position of user 140 relative to a second networked device, e.g., networked device 130(2); and determining the position of user 140 based at least in part on the first estimated position and the second estimated position. In some implementations, in determining the first estimated position of user 140 relative to the first networked device, access point device 120 or one or more of networked devices 130(1)-130(N) may determine the first estimated position using one or more of a sound received by a microphone associated with the first networked device, a strength of a wireless signal received by the first networked device from a portable device carried by the user, or an ultrasonic signal received by the first networked device. The wireless signal may include one or more of the following: a Wi-Fi signal, a Bluetooth signal, an NFC signal, an infrared signal, or a RFID signal.

In some implementations, in determining the first estimated position of user 140 relative to the first networked device, e.g., networked device 130(1), and the second estimated position of user 140 relative to the second networked device, e.g., networked device 130(2), access point device 120 may determine the first and second estimated positions using one or more of a sound received by a microphone associated with the first networked device, a sound received by a microphone associated with the second networked device, a strength of a wireless signal received by the first networked device from a portable device carried by the user, a strength of the wireless signal received by the second networked device from the portable device carried by the user, an ultrasonic signal received by the first networked device, or an ultrasonic signal received by the second networked device. The wireless signal may include one or more of the following: a Wi-Fi signal, a Bluetooth signal, an NFC signal, an infrared signal, or a RFID signal.

Example Implementations

Figure 2:
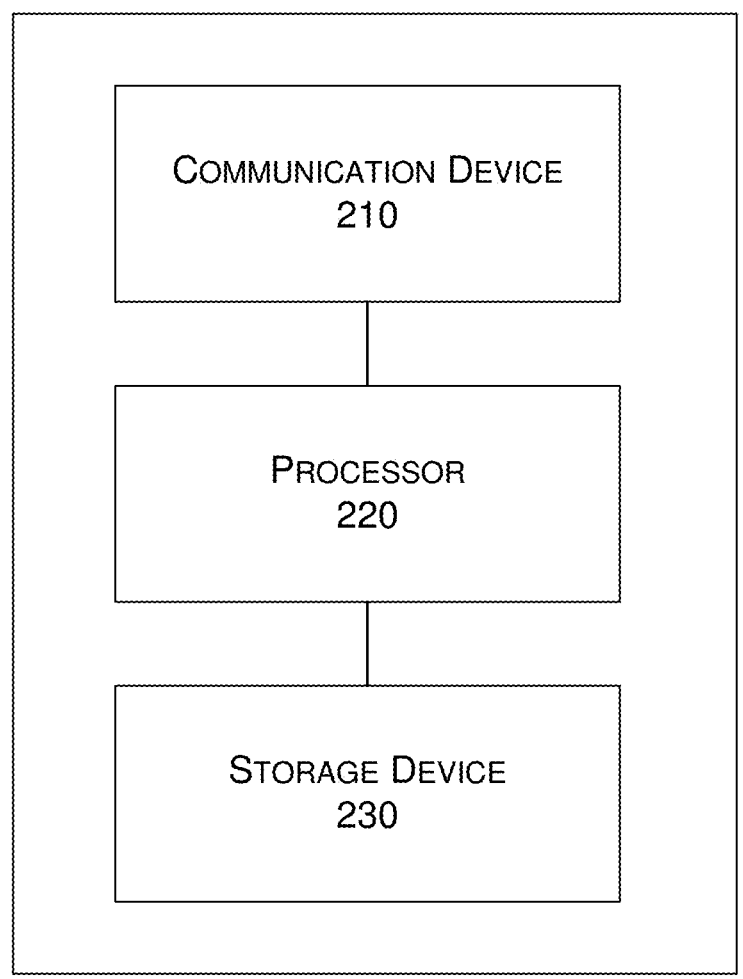
FIG. 2 is a block diagram of an example device in accordance with an implementation of the present disclosure.

FIG. 2 illustrates an example device 200 in accordance with an implementation of the present disclosure.

Example device 200 may perform various functions related to techniques, methods and systems described herein. In some implementations, example device 200 may include at least those components shown in FIG. 2, such as a communication device 210, a processor 220 and a storage device 230. Although communication device 210, processor 220 and storage device 230 are depicted as discrete components separate from each other, in various implementations some or all of communication device 210, processor 220 and storage device 230 may be integral parts of a single module in the form of an integrated circuit (IC), chip or chipset. Each of communication device 210, processor 220 and storage device 230 may be implemented in the form of a physical circuit of electronic components such as transistors, resistors, capacitors, inductors and/or memristors (and optional firmware, middleware, software, or any combination thereof) configured to perform the respective function(s) described herein. In some implementations, example device 200 may be implemented as a chip or a portion of a chip installed in mobile communication device 110, access point device 120 and/or one or more of networked devices 130(1)-130(N) to enable mobile communication device 110, access point device 120 and/or one or more of networked devices 130(1)-130(N) to perform functions thereof as described herein.

Communication device 210 may be configured to transmit and receive signals, e.g., to and from mobile communication device 110, access point device 120 or one or more of networked devices 130(1)-130(N). Communication device 210 may transmit or receive signals wirelessly using one or more suitable technologies, standards and protocols such as, for example, Wi-Fi, Bluetooth, BLE, NFC, infrared, RFID, subsonic waves, sonic waves, ultrasonic waves and yet-to-be-developed wireless technologies.

Storage device 230 may be configured to store information such as position information of user 140, estimated distance between user 140 and one or more of networked devices 130(1)-130(N), positional/locational information and directional information of one or more of networked devices 130(1)-130(N), and any other information used in various implementations of the present disclosure. Storage device 230 may also be configured to store one or more sets of processor-executable instructions. The one or more sets of processor-executable instructions may be firmware, middleware, software or any combination thereof. Storage device 230 may be in the form of any combination of one or more computer-usable or non-transitory computer-readable media. For example, storage device 230 may be in the form of one or more of a removable computer diskette, a hard disk, a random-access memory (RAM) device, a read-only memory (ROM) device, an erasable programmable read-only memory (EPROM or Flash memory) device, a removable compact disc read-only memory (CDROM), an optical storage device, a magnetic storage device, or any suitable storage device. Computer program code for carrying out operations of the present disclosure may be written in any combination of one or more programming languages. Such code, or processor-executable instruction, may be compiled from source code to computer-readable assembly language or machine code suitable for the device or computer on which the code will be executed.

Processor 220 may be coupled to storage device 230 and communication device 210. Processor 220 may be configured to determine or otherwise estimate the position or location of user 140, determine or otherwise estimate the position or location of one or more of networked devices 130(1)-130(N), determine or otherwise estimate the distance between user 140 and one or more of networked devices 130(1)-130(N), determine or otherwise estimate the direction of one or more of networked devices 130(1)-130(N) with respect to user 140, and determine which one of networked devices 130(1) 130(N) is optimally situated to provide notification to user 140 regarding the receipt of incoming information 115 at mobile communication device 110.

Figure 3:
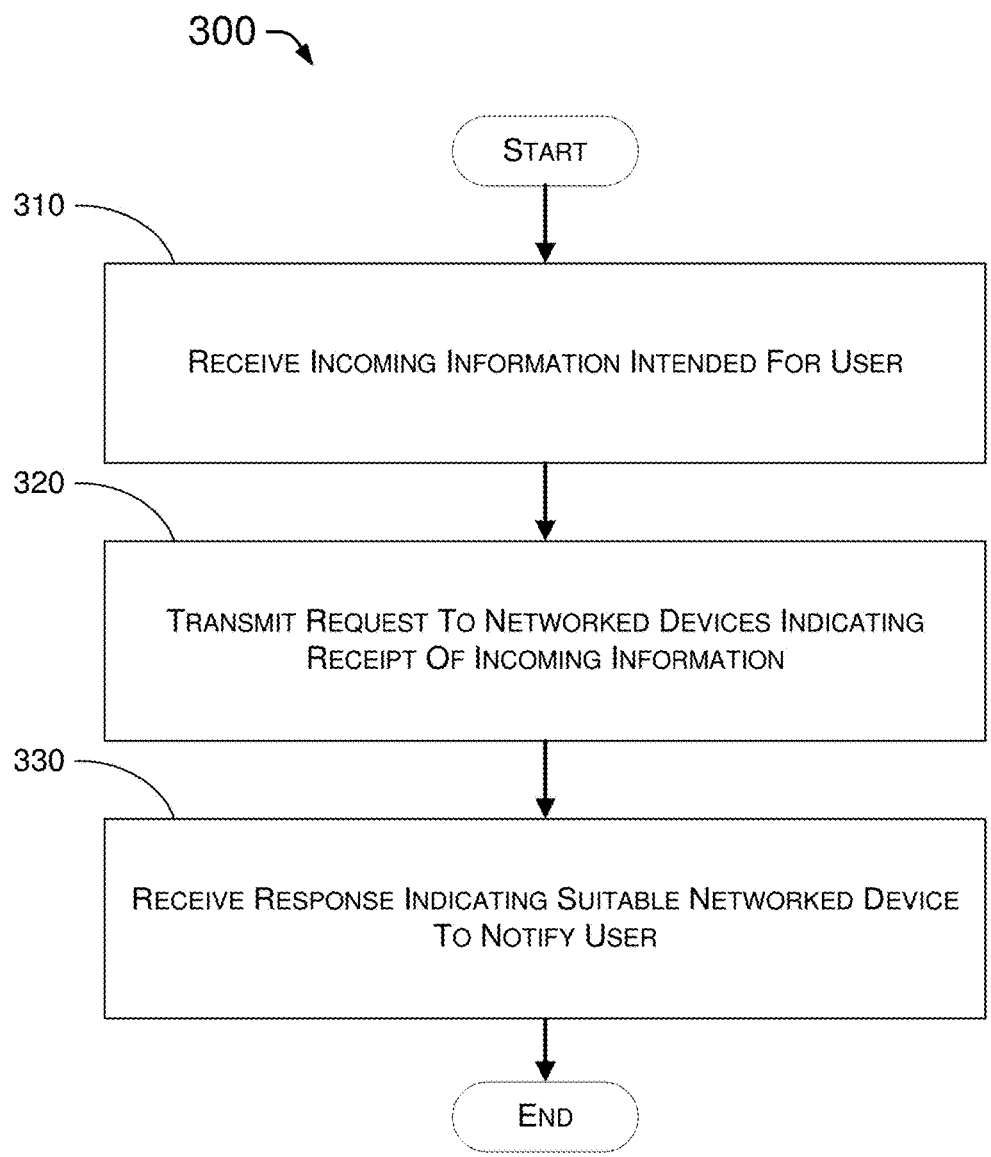
FIG. 3 is a flowchart of an example process in accordance with an implementation of the present disclosure.

FIG. 3 illustrates an example process 300 in accordance with an implementation of the present disclosure.

Example process 300 may include one or more operations, actions, or functions as illustrated by one or more of blocks 310, 320 and 330. Although illustrated as discrete blocks, various blocks may be divided into additional blocks, combined into fewer blocks, or eliminated, depending on the desired implementation. Example process 300 may be implemented by communication device 110. For illustrative purposes, the operations described below with respect to example process 300 are performed by communication device 110 in the context of example environment 100. Example process 300 may begin at block 310.

Block 310 (Receive Incoming Information Intended For User) may refer to communication device 110 receiving incoming information which is intended for receipt by user 140. Block 310 may be followed by block 320.

Block 320 (Transmit Request To Networked Devices Indicating Receipt Of Incoming Information) may refer to communication device 110 transmitting a first request signal to the plurality of networked devices 130(1)-130(N), with the first request signal indicating the receipt of the incoming information by communication device 110. Block 320 may be followed by block 330.

Block 330 (Receive Response Indicating Suitable Networked Device To Notify User) may refer to communication device 110 receiving a response signal indicating that networked device 130(1) of the plurality of networked devices 130(1)-130(N) is situated to notify user 140 of the incoming information.

In some implementations, example process 300 may also involve communication device 110 transmitting, to networked device 130(1), a second request signal that causes networked device 130(1) to notify user 140 of the incoming information. In some implementations, example process 300 may further involve communication device 110 receiving an input from user 140 (e.g., as a result of user 140 moves to proximity of communication device 110 after receiving the notification from networked device 130(1)). Example process 300 may additionally involve communication device 110 providing the incoming information to user 140 responsive to receiving the input.

In some implementations, in receiving the response signal, example process 300 may involve communication device 110 receiving the response signal originated from networked device 130(1), e.g., via access point device 120.

In some implementations, in receiving of the response signal, example process 300 may involve communication device 110 receiving the response signal originated from another networked device (e.g., any of networked devices 130(2)-130(N)).

In some implementations, in transmitting and receiving, example process 300 may involve communication device 110 transmitting and receiving via access point device 120 which is communicatively connected to the plurality of networked devices 130(1)-130(N).

Figure 4:
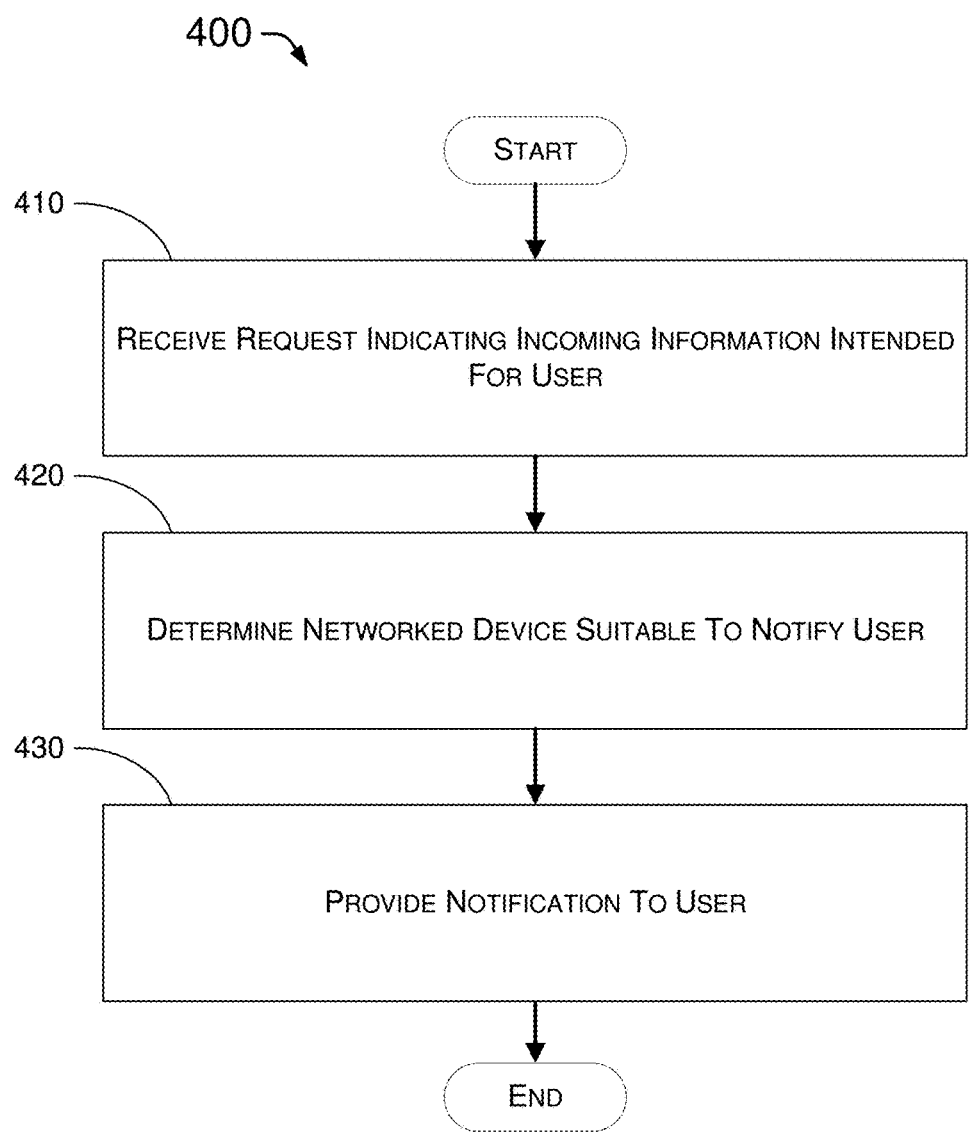
FIG. 4 is a flowchart of an example process in accordance with another implementation of the present disclosure.

FIG. 4 illustrates an example process 400 in accordance with an implementation of the present disclosure.

Example process 400 may include one or more operations, actions, or functions as illustrated by one or more of blocks 410, 420 and 430. Although illustrated as discrete blocks, various blocks may be divided into additional blocks, combined into fewer blocks, or eliminated, depending on the desired implementation. Example process 400 may be implemented by any of networked devices 130(1)-130(N). For illustrative purposes, the operations described below with respect to example process 400 are performed by networked devices 130(1) and 130(2) in the context of example environment 100. Example process 400 may begin at block 410.

Block 410 (Receive Request Indicating Incoming Information Intended For User) may refer to networked device 130(1) receiving a request signal originated from communication device 110. The request signal may indicate that communication device 110 has received incoming information which is intended for receipt by user 140. Block 410 may be followed by block 420.

Block 420 (Determine Networked Device Suitable To Notify User) may refer to networked device 130(1) determining whether networked device 130(1) is situated to notify user 140 of the incoming information. Block 420 may be followed by block 430.

Block 430 (Provide Notification To User) may refer to networked device 130(1) providing a notification to user 140 responsive to a determination that networked device 130(1) is situated to notify user 140.

In some implementations, in receiving the request signal, example process 400 may involve networked device 130(1) receiving the request signal via access point device 120 which is communicatively connected to the networked device 130(1).

In some implementations, example process 400 may additionally involve networked device 130(1) transmitting a response signal indicating that networked device 130(1) is situated to notify user 140 of the incoming information responsive to the determination that networked device 130(1) is situated to notify user 140.

In some implementations, in determining whether networked device 130(1) is situated to notify user 140 of the incoming information, example process 400 may involve networked device 130(1) performing operations that include the following: obtaining position information indicating a position of user 140; determining a first distance between user 140 and networked device 130(1) based at least in part on the position information; receiving information (e.g., via access point device 120) which indicates a second distance between user 140 and networked device 130(2); comparing the first distance and the second distance; and determining that networked device 130(1) is situated to notify user 140 in response to a result of the comparing indicating the first distance being less than the second distance.

In some implementations, in determining whether networked device 130(1) is situated to notify user 140 of the incoming information, example process 400 may involve networked device 130(1) performing operations that include the following: obtaining position information indicating a position of user 140; determining a first direction in which networked device 130(1) is generally oriented to provide either or both audio and visual signals; receiving information (e.g., via access point device 120) which indicates a second direction in which networked device 130(2) is generally oriented to provide either or both audio and visual signals; comparing the first direction and the second direction with respect to the position of user 140; and determining that networked device 130(1) is situated to notify user 140 in response to a result of the comparing indicating the first direction being more toward user 140 than the second direction.

In some implementations, in determining whether networked device 130(1) is situated to notify user 140 of the incoming information, example process 400 may involve networked device 130(1) performing operations that include the following: obtaining position information indicating a position of user 140; determining a first distance between user 140 and networked device 130(1) based at least in part on the position information; determining a first direction in which networked device 130(1) is generally oriented to provide either or both audio and visual signals; receiving information (e.g., via access point device 120) which indicates a second distance between user 140 and networked device 130(2); receiving information (e.g., via access point device 120) which indicates a second direction in which networked device 130(2) is generally oriented to provide either or both audio and visual signals; comparing the first distance and the second distance; comparing the first direction and the second direction; and determining that networked device 130(2) is situated to notify user 140 in response to a result of the comparing of the first distance and the second distance indicating the first distance being less than the second distance and a result of the comparing of the first direction and the second direction indicating the second direction being more toward user 140 than the first direction.

In some implementations, example process 400 may also involve networked device 130(1) obtaining position information indicating a position of user 140.

In some implementations, in obtaining the position information indicating the position of user 140, example process 400 may involve networked device 130(1) performing operations that include the following: determining a first estimated position of user 140 relative to networked device 130(1); receiving (e.g., via access point device 120) a second estimated position of user 140 relative to networked device 130(2); and determining the position of user 140 based at least in part on the first estimated position and the second estimated position.

In some implementations, in determining the first estimated position of user 140 relative to networked device 130(1), example process 400 may involve networked device 130(1) determining the first estimated position of user 140 using one or more of a sound received by a microphone associated with networked device 130(1), a strength of a wireless signal received by networked device 130(1) from a portable device carried by user 140, or an ultrasonic signal received by networked device 130(1).

In some implementations, the wireless signal may include a Wi-Fi signal, a Bluetooth signal, a near field communication (NFC) signal, an infrared signal, or a radio frequency identification (RFID) signal.

Figure 5:
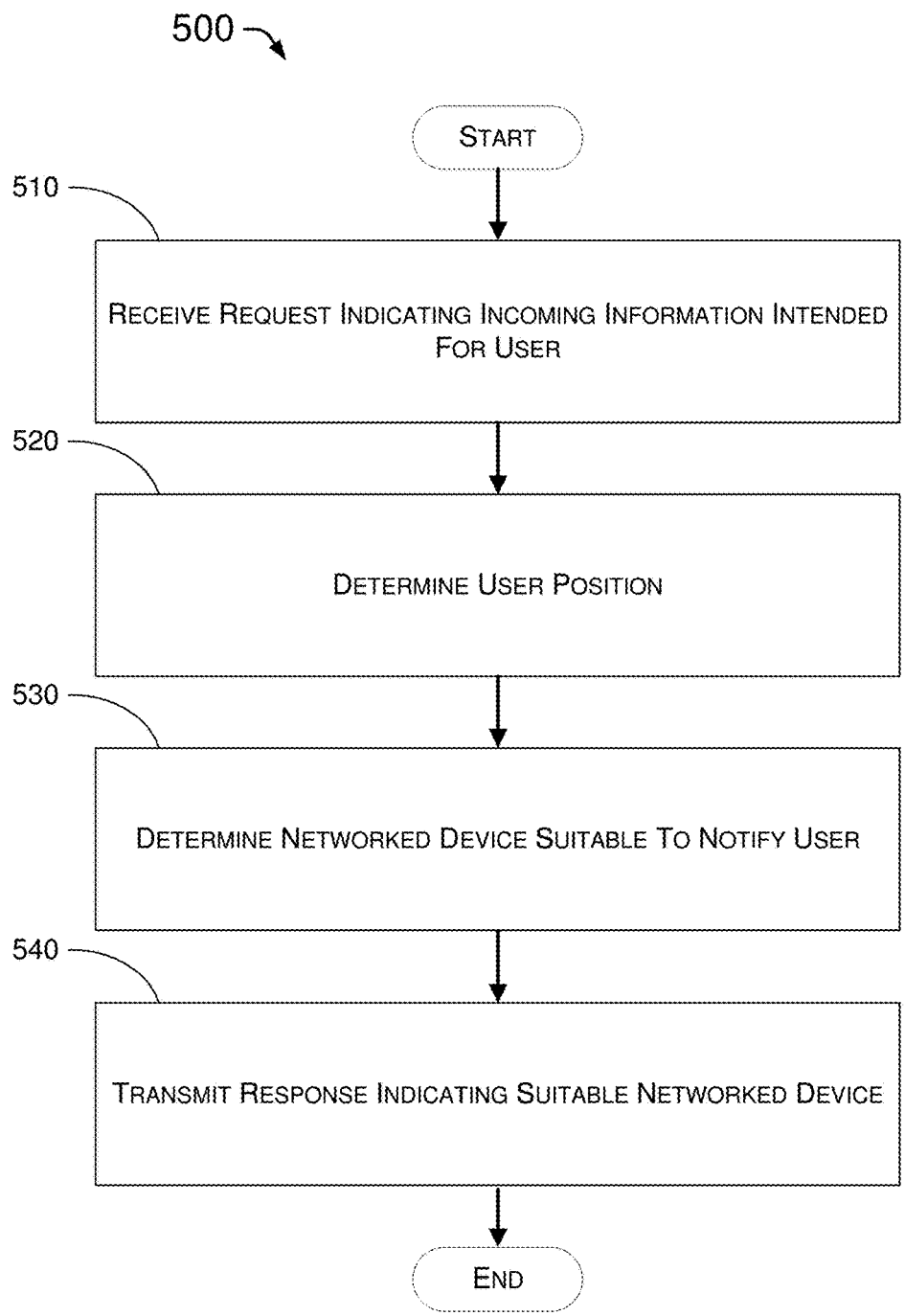
FIG. 5 is a flowchart of an example process in accordance with yet another implementation of the present disclosure.

FIG. 5 illustrates an example process 500 in accordance with an implementation of the present disclosure.

Example process 500 may include one or more operations, actions, or functions as illustrated by one or more of blocks 510, 520, 530 and 540. Although illustrated as discrete blocks, various blocks may be divided into additional blocks, combined into fewer blocks, or eliminated, depending on the desired implementation. Example process 500 may be implemented by access point device 120. For illustrative purposes, the operations described below with respect to example process 500 are performed by access point device 120 in the context of example environment 100. Example process 500 may begin at block 510.

Block 510 (Receive Request Indicating Incoming Information Intended For User) may refer to access point device 120 receiving a first request signal, e.g., from communication device 110. Block 510 may be followed by block 520.

Block 520 (Determine User Position) may refer to access point device 120 determining a position of user 120. Block 520 may be followed by block 530.

Block 530 (Determine Networked Device Suitable To Notify User) may refer to access point device 120 determining that networked device 130(1) of the plurality of networked devices 130(1)-130(N) is situated to notify user 140 of the incoming information. Block 530 may be followed by block 540.

Block 540 (Transmit Response Indicating Suitable Networked Device) may refer to access point device 120 transmitting a response signal to communication device 110 to indicate that networked device 130(1) is situated to notify user 140 of the incoming information.

In some implementations, in determining that networked device 130(1) is situated to notify user 140 of the incoming information, example process 500 may involve access point device 120 performing operations that include the following: determining a first distance between user 140 and networked device 130(1) based at least in part on the position of user 140; determining a second distance between user 140 and networked device 130(2); comparing the first distance and the second distance; and determining that networked device 130(1) is situated to notify user 140 in response to a result of the comparing indicating the first distance being less than the second distance.

In some implementations, in determining that networked device 130(1) is situated to notify user 140 of the incoming information, example process 500 may involve access point device 120 performing operations that include the following: determining a first direction in which networked device 130(1) is generally oriented to provide either or both audio and visual signals; determining a second direction in which networked device 130(2) is generally oriented to provide either or both audio and visual signals; comparing the first direction and the second direction with respect to the position of user 140; and determining that networked device 130(1) is situated to notify user 140 in response to a result of the comparing indicating the first direction being more toward user 140 than the second direction.

In some implementations, in determining that networked device 130(1) is situated to notify user 140 of the incoming information, example process 500 may involve access point device 120 performing operations that include the following: determining a first distance between user 140 and networked device 130(1) based at least in part on the position of user 140; determining a first direction in which networked device 130(1) is generally oriented to provide either or both audio and visual signals; determining a second distance between user 140 and networked device 130(2); determining a second direction in which networked device 130(2) is generally oriented to provide either or both audio and visual signals; comparing the first distance and the second distance; comparing the first direction and the second direction; and determining that networked device 130(2) is situated to notify user 140 in response to a result of the comparing of the first distance and the second distance indicating the first distance being less than the second distance and a result of the comparing of the first direction and the second direction indicating the second direction being more toward the user than the first direction.

In some implementations, in determining the position of user 140, example process 500 may involve access point device 120 performing operations that include the following: determining a first estimated position of user 140 relative to networked device 130(1); determining a second estimated position of user 140 relative to networked device 130(2); and determining the position of user 140 based at least in part on the first estimated position and the second estimated position.

In some implementations, in determining the first estimated position of user 140 relative to networked device 130(1) as well as the second estimated position of user 140 relative to networked device 130(2), example process 500 may involve access point device 120 determining the first and second estimated positions using one or more of a sound received by a microphone associated with networked device 130(1), a sound received by a microphone associated with networked device 130(2), a strength of a wireless signal received by networked device 130(1) from a portable device carried by user 140, a strength of the wireless signal received by networked device 130(2) from the portable device carried by user 140, an ultrasonic signal received by networked device 130(1), or an ultrasonic signal received by networked device 130(2).

In some implementations, the wireless signal may include a Wi-Fi signal, a Bluetooth signal, an NFC signal, an infrared signal, or a RFID signal.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving, by a first networked device, a request signal originated from a communication device, the request signal indicating the communication device receiving incoming information which is intended for receipt by a user, the incoming information being from one of one or more predetermined senders or being one of one or more predetermined types of information;
determining, by the first network device, a position of the user;
determining, by the first networked device, whether the first networked device is situated to notify the user of the incoming information based at least in part on the position of the user; and
providing, by the first networked device, a notification to the user responsive to a determination that the first networked device is situated to notify the user,
wherein the receiving comprises receiving via an access point device which is communicatively connected to the first networked device,
wherein the determining of whether the first networked device is situated to notify the user of the incoming information based at least in part on the position of the user comprises performing a distance-based determination and a direction-based determination,
wherein the performing of the distance-based determination comprises:
determining a first distance between the user and the first networked device based at least in part on the position of the user;
receiving information indicating a second distance between the user and a second networked device;
comparing the first distance and the second distance; and
determining that the first networked device is situated to notify the user in response to a result of the comparing indicating the first distance being less than the second distance,
wherein the performing of the direction-based determination comprises:
determining a first direction in which the first networked device is generally oriented to provide either or both audio and visual signals;
receiving information indicating a second direction in which the second networked device is generally oriented to provide either or both audio and visual signals;
comparing the first direction and the second direction with respect to the position of the user; and
determining that the first networked device is situated to notify the user in response to a result of the comparing indicating the first direction being more toward the user than the second direction,
wherein the determining of the position of the user comprises:
determining a first estimated position of the user relative to the first networked device;
receiving information indicating a second estimated position of the user relative to the second networked device; and
determining the position of the user based at least in part on the first estimated position and the second estimated position, and
wherein the determining of the first estimated position of the user relative to the first networked device comprises determining using one or more of a sound received by a microphone associated with the first networked device, a strength of a wireless signal received by the first networked device from a portable device carried by the user, or an ultrasonic signal received by the first networked device.

2. The method of claim 1, further comprising:
transmitting, by the first networked device, a response signal indicating that the first networked device is situated to notify the user of the incoming information responsive to the determination that the first networked device is situated to notify the user.

3. A system, comprising:
a communication device configured to perform operations comprising:
receiving incoming information which is intended for receipt by a user;
determining whether the incoming information is from any of one or more predetermined senders or whether a type of the incoming information is any of one or more predetermined types; and
transmitting a first request signal responsive to a determination that the incoming information is from one of the one or more predetermined senders or that the type of the incoming information is one of the one or more predetermined types, the first request signal indicating the receiving of the incoming information at the communication device;
a plurality of networked devices; and an access point device communicatively connected to the communication device and the plurality of networked devices, the access point device configured to perform operations comprising:
  receiving the first request signal;
  determining a position of the user;
  determining that a first networked device of the plurality of networked devices is situated to notify the user of the incoming information; and
  transmitting a response signal to the communication device, the response signal indicating that the first networked device is situated to notify the user of the incoming information,
wherein the plurality of networked devices transmit and receive signals via the access point device,
wherein, in determining that the first networked device of the plurality of networked devices is situated to notify the user of the incoming information, the access point device performs a distance-based determination and a direction-based determination,
wherein, in performing the distance-based determination, the access point device performs operations comprising:
  determining a first distance between the user and the first networked device based at least in part on the position of the user;
  determining a second distance between the user and a second networked device of the plurality of networked devices;
  comparing the first distance and the second distance; and
  determining that the first networked device is situated to notify the user in response to a result of the comparing indicating the first distance being less than the second distance,
wherein, in performing the direction-based determination, the access point device performs operations comprising:
  determining a first direction in which the first networked device is generally oriented to provide either or both audio and visual signals;
  determining a second direction in which the second networked device of the plurality of networked devices is generally oriented to provide either or both audio and visual signals;
  comparing the first direction and the second direction with respect to the position of the user; and
  determining that the first networked device is situated to notify the user in response to a result of the comparing indicating the first direction being more toward the user than the second direction,
wherein, in determining the position of the user, the access point device performs operations comprising:
  determining a first estimated position of the user relative to the first networked device;
  determining a second estimated position of the user relative to the second networked device of the plurality of networked devices; and
  determining the position of the user based at least in part on the first estimated position and the second estimated position, and
wherein, in determining the first estimated position of the user relative to the first networked device and the second estimated position of the user relative to the second networked device, the access point device is configured to determine using one or more of a sound received by a microphone associated with the first networked device, a sound received by a microphone associated with the second networked device, a strength of a wireless signal received by the first networked device from a portable device carried by the user, a strength of the wireless signal received by the second networked device from the portable device carried by the user, an ultrasonic signal received by the first networked device, or an ultrasonic signal received by the second networked device.

4. The system of claim 3, wherein:
the communication device is further configured to perform operations comprising:
receiving the response signal indicating that a first networked device of the plurality of networked devices is situated to notify the user of the incoming information; and
transmitting a second request signal that causes the first networked device to notify the user of the incoming information.

5. The system of claim 4, wherein:
the first networked device is configured to perform operations comprising:
receiving the second request signal; and
providing a notification to the user responsive to receiving the second request signal.

* * * * *